United States Patent [19]

Beser et al.

[11] 4,051,211
[45] Sept. 27, 1977

[54] APPARATUS AND PROCESS

[75] Inventors: William Beser, Burbank; Edwin R. Cole, Huntington Beach, both of Calif.

[73] Assignee: The Upjohn Company, Kalamazoo, Mich.

[21] Appl. No.: 688,169

[22] Filed: May 20, 1976

[51] Int. Cl.² .......................................... B29D 27/04
[52] U.S. Cl. ..................................... 264/51; 198/495; 261/115; 264/46.2; 264/48; 264/79; 264/233
[58] Field of Search ................. 264/54, 48, 46.2, 51, 264/79, 233; 261/115; 198/495

[56] References Cited
U.S. PATENT DOCUMENTS

| 2,327,001 | 8/1943 | Schott | 264/48 X |
| 2,850,467 | 9/1958 | Livingood | 264/54 |
| 2,983,234 | 5/1961 | Reilly | 261/115 X |
| 3,013,924 | 12/1961 | Taft et al. | 264/48 X |
| 3,152,361 | 10/1964 | Edwards | 264/54 X |
| 3,382,303 | 5/1968 | Stieg | 264/49 |
| 3,655,311 | 4/1972 | Porter | 264/46.2 X |

*Primary Examiner*—Philip Anderson
*Attorney, Agent, or Firm*—Denis A. Firth; John Kekich

[57] ABSTRACT

A process and apparatus is described by means of which the pollution of the surrounding atmosphere by the fumes of isocyanate, liberated during the continuous formation of isocyanate-based polymer foam bunstock, is minimized. The bunstock, after the foam rise and gelation is completed, is passed through a zone, installed on the bunstock conveyor, in which the foam is subjected to the action of a fine mist of water sprayed on to the top and sides of the foam bunstock. The application of water in this manner does not affect the properties or appearance of the foam and any excess water coating the surface of the foam evaporates during the remainder of the passage of the bunstock down the conveyor. The above procedure is particularly applicable to the production of foam bunstock which is based on the highly volatile toluene diisocyanate.

6 Claims, 6 Drawing Figures

APPARATUS AND PROCESS

BACKGROUND OF THE INVENTION

1. Field of the Invention

This invention relates to control of pollution of air by toxic substances and is more particularly directed to control of pollution of air by volatilized isocyanate generated in the formation of polymer foam bunstock.

2. Description of the Prior Art

The production of both rigid and flexible cellular polymers, based on polyisocyanates, on a continuous basis in a form known as "bunstock" is well-recognized in the art. The polyisocyanate-based foams include polyurethane foams, which are obtained by reaction of polyisocyanates with polyols such as polyether and polyester polyols; polyisocyanurate foams in which the polyisocyanate is trimerized, usually in the presence of minor amounts of polyols, as a part of the foam forming operation, and, more recently, polycarbodiimide-polyisocyanurate copolymer foams in which the polyisocyanate is subjected to the simultaneous action of trimerizing catalysts and carbodiimide-forming catalysts while the foam formation takes place.

The forming of the isocyanate-based foams on a continuous basis is conventionally carried out by dispensing the polymer foam forming ingredients at the top of an inclined conveyor belt which is in slow, but constant, motion. The belt generally carries a paper liner on which the actual foam is deposited. The conveyor is generally provided with two vertical sides at least in the portion immediately below the point at which the foam mix is deposited. There is thus formed a generally U-shaped mold in which the foam mix is shaped as it rises. The two vertical sides are normally in the form of continuous belts which move in synchronism with the inclined conveyor belt. Paper liners are interposed, by feeding in a continuous manner, between the edges of the rising foam and the vertical belts of the side walls. The above type of procedure is described in, for example, U.S. Pat. No. 3,152,361. In some types of operation the paper liners used to separate the side surfaces of the foam from the mold are caused to rise, at least in their initial path, in a direction parallel to the surface of the rising foam; see, for example, U.S. Pat. Nos. 3,091,811 and 3,719,734.

During the initial stages of the formation of the foam bunstock considerable heat is evolved due to the exothermic nature of the polymer foam forming reaction. For example, temperatures as high as 340° F can be reached in the interior of polyurethane foams which are prepared by commercial bunstock operations. Such exotherms can cause volatilization of the polyisocyanate employed in the formation of the foam and give rise to potentially harmful pollution of the atmosphere in the vicinity of the bunstock machine. This problem is particularly severe in the case of toluene diisocyanate which, in the form of the 2,4- or 2,6-isomer or mixtures thereof, is the diisocyanate most commonly employed in the preparation of flexible polyurethane foams. Toluene diisocyanate is relatively volatile and significant pollution of the surrounding atmosphere can occur when it is employed in continuous bunstock manufacture. The problem can be alleviated by installing exhaust hoods and the like over those sections of the bunstock apparatus in which the major portion of volatilization of the isocyanate occurs. However, since the bunstock apparatus usually extends for considerable distances, of the order of 100 feet or more, it is generally impracticable to install venting means throughout the length of the conveyor to exhaust the diisocyanate fumes.

The above problem has become even more acute because of the rigid standards imposed by state and federal authorities on the permissible level of polyisocyanates which can be discharged into the atmosphere.

We have now found that the above problem can be solved in a relatively simple but elegant manner by the process which is described hereinafter.

SUMMARY OF THE INVENTION

This invention comprises methods for minimizing the atmospheric pollution produced by volatilization of isocyanates during formation of isocyanate-based polymer foams in a continuous bunstock operation. The process of the invention comprises passing the isocyanate-based polymer foam bunstock, after foam rise and gelation has been completed, through an enclosed zone in which the surrounding atmosphere, and the top and sides of said foam bunstock are subjected to the action of a fine aqueous spray. The zone in which the treatment is carried out generally takes the form of an elongated chamber which is mounted astride the conveyor down which the bunstock is being transported. The chamber is provided with openings at each end thereof which openings have substantially the same configuration as the cross-sectional configuration of the foam bunstock and which permit passage of the bunstock into and out of the chamber. The chamber, on its interior surfaces, is provided with a plurality of nozzle means from which sprays of water at ambient temperature can be used to maintain relatively high humidity in the chamber and, in a preferred embodiment, can be directed at the sides and top of the bunstock as it passes through the chamber.

The isocyanate fumes which are being volatilized from the polymer foam bunstock are removed, during passage of the foam bunstock through the enclosed zone, by reaction with the water in the sprays to form the urea in accordance with the following equation:

$$2(R\text{-}NCO) + H_2O \rightarrow R\text{-}NHCONH\text{-}R + CO_2 \uparrow$$

In addition, it is believed that the above reaction results in formation of a thin coating of urea on the surface of the foam which tends to prevent any further volatilization of isocyanate from the interior of the foam after the bunstock foam leaves the enclosed zone.

DETAILED DESCRIPTION OF THE INVENTION

Figure 1:
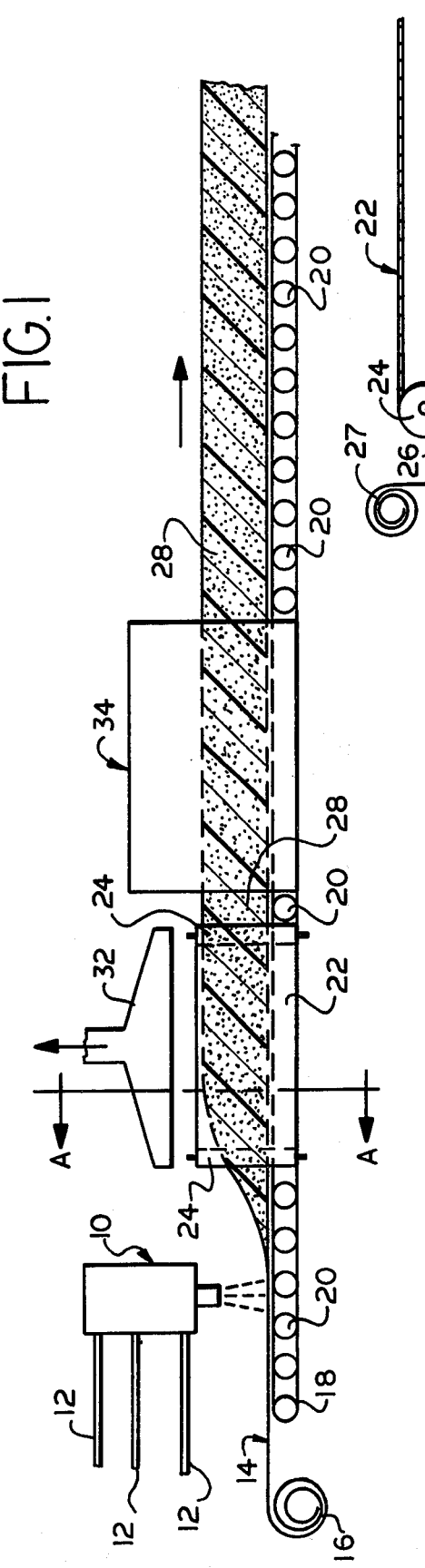
FIG. 1 is a side elevational view, partially in schematic form, of a conveyor system for the production of polymer foam bunstock.

The use of the apparatus shown schematically in FIG. 1 illustrates one embodiment of the process of the present invention.

The various components of an isocyanate-based polymer foam forming mix are fed to mixing head (10) via flexible hoses (12) and the foam mix is dispensed from the mixing head on to a continuously advancing paper web (14) which is fed from roll (16). The mixing head (10) is suspended from a bridge (not shown) and is caused to traverse back and forth across the width of paper web (14) in a direction at right angles to the direction in which the paper web (14) is advanced. The paper web (14) is supported on, and moves synchronously with, an endless conveyor belt (18), which latter is in turn supported by roller bars (20). The bed of the conveyor, formed by the endless belt (18) moving on roller bars (20), is inclined at an angle of about 4° – 8° to the horizontal and slopes downwardly away from the point at which foam mix is deposited from mixing head (10) on to the paper web (14).

As the foam mix deposited on the paper web (14) begins to rise, i.e. foam formation commences, it passes into the molding zone which is formed by two endless belts (22) disposed vertically one on each side of the conveyor and supported on roller bars (24). The belts (22) are made to move independently but synchronously with the lower conveyor belt (18) by means of appropriate drive mechanism (not shown). Means are also provided for feeding side paper webs (26) between the side of the rising foam and the inwardly facing surface of the side belts (22).

Figure 2A:
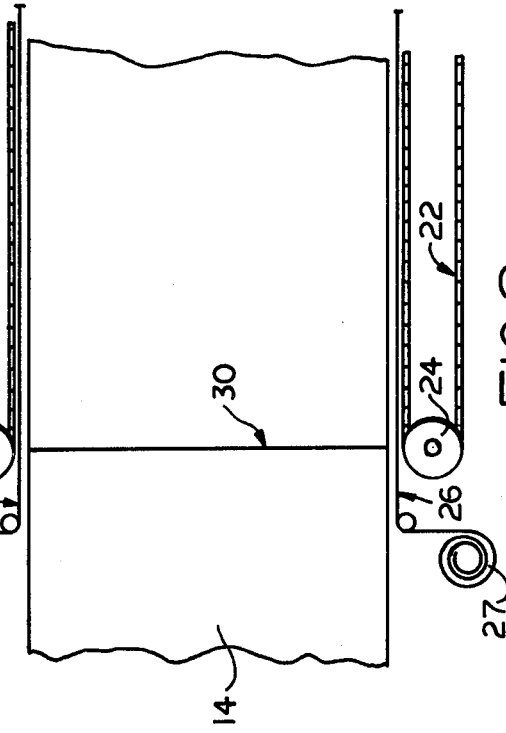
FIG. 2a is a plan view of a portion of the molding zone shown in cross-sectional view in FIG. 2.
Figure 2:
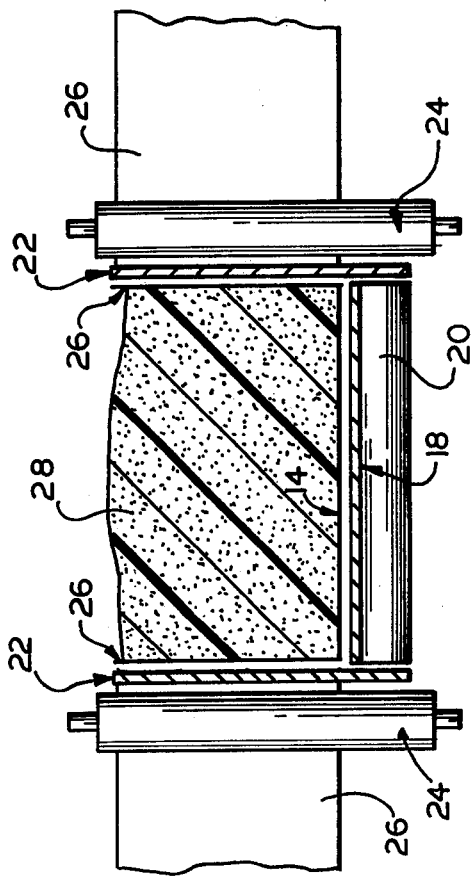
FIG. 2 is a cross-sectional view taken along line A—A of FIG. 1.
Figure 3:
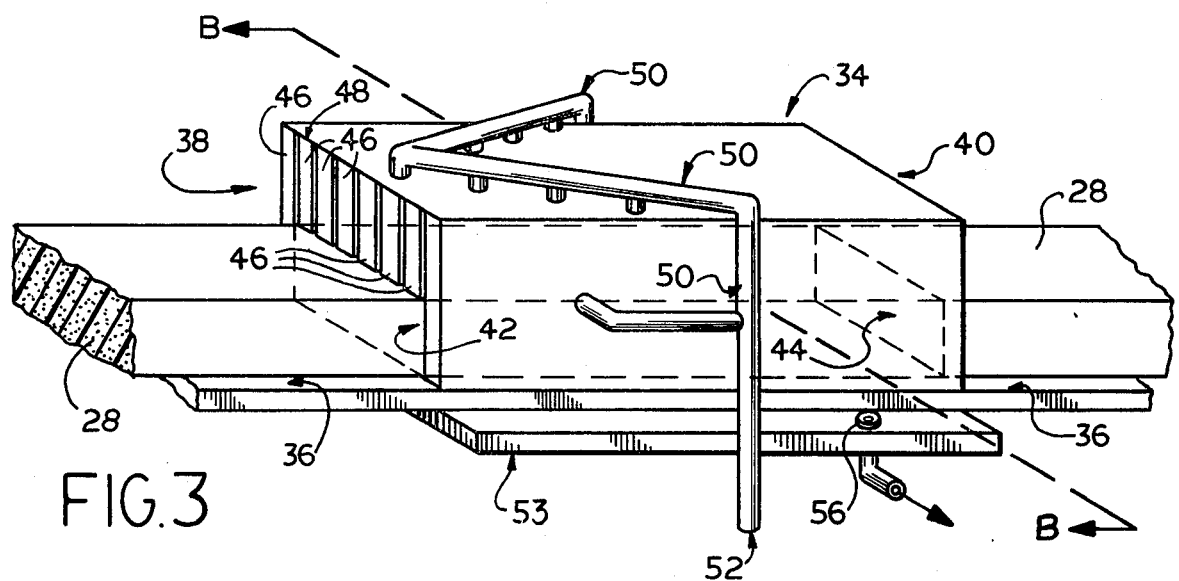
FIG. 3 is a partial perspective view of an embodiment of the spray zone shown schematically in FIG. 1.

The construction and mode of operation of the molding zone is illustrated further by the cross-sectional view shown in FIG. 2, which is taken through line A—A of the molding zone shown in FIG. 1, and by the partial plan view of the molding zone which is shown in FIG. 3. The side papers (26) are fed from rollers (27) between the side of the rising foam (28) and the inwardly facing section of the side belts (22). At the stage of foam rise at which the foam mix enters the molding zone, i.e. reaches the point represented by line (30), the foam has not risen above the upturned edge (generally 2 to 3 inches in height) of the bottom paper web (14). The edges of the latter are folded upwardly by a folding device (not shown) which is disposed between the paper feed roll (16) and the point at which the foam mix is dispensed on to said paper web (14).

The molding zone is of sufficient length to permit the rise and gelation of the foam (28) to be completed therein. The molding zone is generally provided with hood means (32) for removal of fumes generated by the rising foam. The fumes so removed through hood (32) are subjected to chemical scrubbing, for example, scrubbing with dilute aqueous sodium hydroxide, to remove isocyanate and other contaminants therefrom.

It will be appreciated by one skilled in the art that the description so far provided of the operation of the continuous bunstock apparatus of FIG. 1 relates to procedures conventionally used in the art; see, for example, U.S. Pat. No. 3,152,361. Details of methods for proportioning, premixing and dispensing of polymer foam forming ingredients are not given here because they are well-recognized in the art; see, for example, U.S. Pat. No. 3,655,311. The novel feature of the present invention lies in the incorporation of the zone referred to as (34) in FIG. 1 and illustrated more fully in the various views shown in FIGS. 3, 4 and 5.

Thus, in accordance with this novel feature, the foam bunstock leaving the molding zone in fully foamed and gelled form is passed into the spray zone (34) which, in the embodiment shown schematically in FIG. 1 and in perspective view in FIG. 3, takes the form of an elongated chamber (34) having a rectangular cross-section which is mounted astride the conveyor belt (18) advantageously by appropriate attachment, using bolts, rivets and the like, of the lower outer frame members of the chamber (34) to flanges (36) projecting from the side of the frame supporting the conveyor belt (18) and rollers (20). The chamber (34) is constructed of any appropriate material such as sheet metal, plastic, rubber and the like.

In a particular embodiment the chamber (34) is constructed by covering an appropriate frame with plastic sheet. The upper end (38) of the chamber (34), i.e. the end abutting the molding zone (22), is provided with an opening or entrance port (42) which has a configuration corresponding substantially to that of the cross-section of the foam bunstock (28) at the point at which the latter enters said chamber. Similarly, the lower end (40) of the chamber (34) is provided with a similar opening or exit port (44) [shown in dotted lines] which also has a configuration approximating that of the cross-section of the foam bunstock (28).

Figure 5:
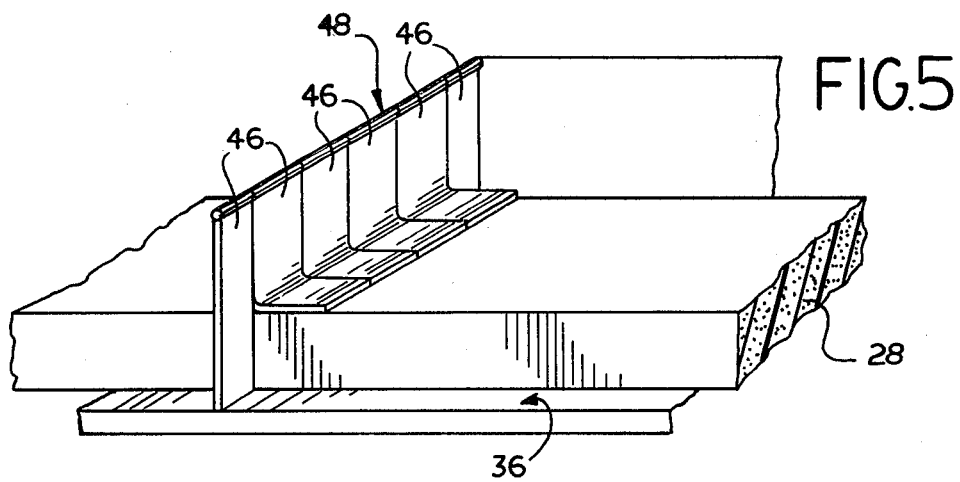
FIG. 5 is a partial perspective view of the interior of the spray zone shown in FIG. 3.

In a preferred embodiment the configurations of the entrance port (42) and exit port (44) in the ends (38) and (40) of the chamber (34) are adjustable so as to provide a close-fit around the upper and side faces of the foam bunstock (28) without impeding the passage of the latter through the chamber (34). Illustratively, the upper end (38) of the chamber (34) can be formed by a series of flexible strips (46) of sheet material such as rubber, plastic and the like, which strips are suspended from the upper edge (48) of the end (38) and which hang freely therefrom with their vertical edges in overlapping relationship. The strips (46) are preferably of sufficient length so that, when no foam bunstock is being passed through chamber (34), the lower ends of said strips will reach to the floor of the conveyor and thereby form a completely enclosed end of said chamber. When foam bunstock (28) is passing through the chamber (34), the lower ends of those of strips (46) which lie in the path of the foam bunstock will be displaced and lie along the upper surface of the bunstock thus providing a curtain wall substantially surrounding the top and sides of the moving bunstock and providing an end closure for the chamber (34). The partial perspective view of the inner side of the end wall (38) shown in FIG. 5 illustrates the manner in which the strips (46) are arranged when the foam bunstock (28) is passing through said end wall. The other end (40) of the chamber (34) can be constructed of a plurality of flexible strips arranged in the same manner so as to provide a curtain wall enclosure substantially surrounding the top and sides of the moving bunstock as it exits from the chamber (34).

Figure 4:
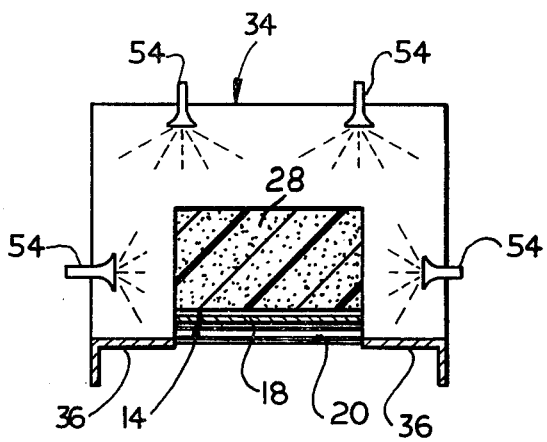
FIG. 4 is a cross-sectional view taken along line B—B of FIG. 3.

Fluid conduits (50) supply water from a source (52), not shown, through the top and sides of chamber (34) to a series of spray nozzle members (54) on the interior of the walls and sides of the chamber (34) as is shown in the cross-sectional view of FIG. 4 which is taken along line B–B in FIG. 3. In the particular embodiment shown in FIG. 3 and FIG. 4 the nozzles (54) in the roof of chamber (34) are disposed in V-shaped arrangement and the nozzles in the side of the chamber (34) are shown as having their spray pattern directed against the side walls of foam bunstock (28). This particular arrangement is found to be a convenient one but it is to be understood that the precise arrangement of the nozzles (54) is not critical so long as a constant fine mist or spray of water at ambient temperature is maintained within the chamber (34) sufficient to wet all the exposed surfaces of the foam bunstock (28) as well as to maintain a high relative humidity, of the order of 80% or higher, in the chamber (34).

The aqueous washings which pass to the bottom of the chamber (34) during operation of the above process are collected and conducted to appropriate disposal means. This can be accomplished by providing chamber (34) with a fluid collection pan (53) which extends beneath the conveyor and is coextensive with the underside of the chamber (34). The pan has one or more drain holes (56), provided in the lower end thereof, from which the collected washings are removed and conducted to the sewer. If desired, the drain pan (53) can be integral with the chamber (34) and form the floor thereof.

The appropriate length of chamber (34), and the number and most convenient arrangements of nozzles (54) therein, can be readily determined by a process of trial and error. Thus, the length of the chamber (34) is, in part, a function of the rate at which the foam bunstock is being transported therethrough. In general, it is found that satisfactory control of the emission of isocyanates from the bunstock can be achieved with an average residence time of bunstock in the chamber of the order of about 2 minutes. Thus, for example, if the speed of the conveyor [and hence the speed of passage of the bunstock through the chamber (34) ] is of the order of sixteen feet per minute, the length of the chamber (34) should be of the order of twice sixteen feet, i.e. thirty-two feet.

After the foam bunstock (28) emerges from the chamber (34), it continues down the conveyor (18) until it reaches a cutting station where, in accordance with conventional procedures in the art, the bunstock is cut into appropriate lengths and the cut sections are removed from the conveyor to a curing station. In general the distance between the point at which the bunstock emerges from the chamber (34) and the point at which the cutting station is reached, is sufficient to permit evaporation from the bunstock of the film of water which is present on the surface of the bunstock as it emerges from the chamber.

The process of the invention have been described with reference to a particular embodiment of the spray chamber (34) but, as will be readily understood by one skilled in the art, the precise configuration and design of said chamber (34) can be modified without departing from the scope of the present invention which is limited only by the claims set forth below.

The process of the invention is applicable to the control of pollution of the surrounding atmosphere during the formation of continuous bunstock foam which is derived using a polyisocyanate as one of the reactants. It is particularly useful in those operations which employ the relatively highly volatile isocyanate, toluene diisocyanate, which isocyanate is the one chiefly responsible for undesirable levels of toxic fumes in the polymer foam industry. It is found, surprisingly, that the process described herein does not adversely affect the physical properties of the foam bunstock which is subjected to the process.

We claim:

1. A process for minimizing atmospheric pollution produced by volatilization of isocyanate during formation of isocyanate-based polymer foam in a continuous bunstock operation which comprises passing said foam in the form of a continuous bun, after foam rise and gelatin have been completed, through a substantially enclosed zone of high relative humidity maintained at ambient temperature.

2. A process according to claim 1 wherein said isocyanate-based polymer foam is a polyurethane foam derived by reaction of toluene diisocyanate with a polyol under foam producing conditions.

3. A process according to claim 1 wherein said enclosed zone comprises an elongated chamber straddling the continuous foam bun said chamber being provided with entrance and exit ports which are adjustable in size to conform substantially to the cross-sectional area of the foam.

4. The process of claim 3 in which the interior of said elongated chamber is provided with nozzle means for maintaining high relative humidity in said chamber and for directing water spray at ambient temperature on to the top and sides of said continuous bun.

5. The process of claim 4 in which said elongated chamber is also provided with drain means for removing said water after spraying.

6. The process of claim 3 in which said adjustable size entrance and exit ports are comprised of a plurality of strips of flexible sheet material, said strips being suspended by their upper ends in a vertical plane at right angles to the direction of travel of said foam bun, the vertical edges of each strip overlapping the vertical edges of the adjacent strips.

* * * * *